US010083237B2

(12) United States Patent
Heiler et al.

(10) Patent No.: US 10,083,237 B2
(45) Date of Patent: Sep. 25, 2018

(54) PROTECTING USERS FROM INAPPROPRIATE SENSITIVE OR OFFENSIVE SEARCH RESULTS

(71) Applicant: Google LLC, Mountain View, CA (US)

(72) Inventors: Matthias Heiler, Zurich (CH); Michael Schaer, Zurich (CH); Nikola Todorovic, Zurich (CH); Robin Nittka, Zurich (CH); Thomas Fischbacher, Zurich (CH); Laura Dragoi, Zurich (CH)

(73) Assignee: Google LLC, Mountain View, CA (US)

( * ) Notice: Subject to any disclaimer, the term of this patent is extended or adjusted under 35 U.S.C. 154(b) by 312 days.

(21) Appl. No.: 14/841,078

(22) Filed: Aug. 31, 2015

(65) Prior Publication Data

US 2017/0061014 A1    Mar. 2, 2017

(51) Int. Cl.
   G06F 17/30          (2006.01)
(52) U.S. Cl.
   CPC .. G06F 17/30867 (2013.01); G06F 17/30528 (2013.01)
(58) Field of Classification Search
   CPC .............. G06F 17/30867; G06F 17/30528
   USPC .......................... 707/754, E17.109
   See application file for complete search history.

(56) References Cited

U.S. PATENT DOCUMENTS

| | | | | |
|---|---|---|---|---|
| 8,688,667 B1* | 4/2014 | Kurzion | ............ | G06F 17/30867 706/16 |
| 9,262,646 B1* | 2/2016 | Yeo | ............ | G06F 21/6227 |
| 9,721,020 B2* | 8/2017 | Clark | ............ | G06F 17/30867 |
| 9,971,838 B2* | 5/2018 | Adams | ............ | G06F 17/30867 |
| 2008/0162540 A1* | 7/2008 | Parikh | ............ | G06F 17/30867 707/E17.109 |
| 2008/0313173 A1 | 12/2008 | Popper | | |
| 2012/0150850 A1* | 6/2012 | Parthasarathy | ... | G06F 17/30867 707/728 |
| 2012/0323888 A1* | 12/2012 | Osann, Jr. | ......... | G06F 17/30991 707/722 |
| 2013/0138641 A1 | 5/2013 | Korolev et al. | | |
| 2015/0039579 A1* | 2/2015 | Clark | ............ | G06F 17/30867 707/706 |
| 2016/0246884 A1* | 8/2016 | Adams | ............ | G06F 17/2785 |

* cited by examiner

Primary Examiner — Phong H Nguyen
(74) Attorney, Agent, or Firm — Fish & Richardson P.C.

(57) ABSTRACT

A system and method for providing a search experience in which users are protected from exposure to inappropriate offensive or sensitive content is described. A search system may classify a search query and candidate search results obtained in response to the search query. Based on the classification of the search query and search results, the candidate search results may be modified to generate a set of search results presented to a user such that the presented search results do not include inappropriate sensitive or offensive content.

13 Claims, 6 Drawing Sheets

PROTECTING USERS FROM INAPPROPRIATE SENSITIVE OR OFFENSIVE SEARCH RESULTS

FIELD

This disclosure generally relates to search engines.

BACKGROUND

Internet users can search for various types of content using search engines. Internet content may include sensitive or offensive content such as, for example, pornography, gory images, and violent content. In some cases, users may involuntarily be exposed to inappropriate sensitive or offensive content. Accordingly, it may be desirable to limit exposure to inappropriate sensitive or offensive content available on the Internet.

SUMMARY

This disclosure generally describes a method and system for applying classifiers to search queries and search results to provide a search experience in which users are protected from exposure to inappropriate offensive or sensitive content.

According to implementations, a search engine receives a search query from a user device and generates a preliminary set of search results in response to the search query. The search query is classified by a classifier to determine whether the search query includes one or more terms associated with a protected class of people, and one or more terms associated with sensitive or offensive content, such as pornographic or violent content. The preliminary set of search results are also classified by a classifier to determine whether search results in the preliminary set of search results include sensitive or offensive content. Classifying signals from the classifiers are provided to the search engine, which selects search results from the preliminary set of search results based on the classification signals according to one or more rules. The selected search results are then provided to the user device. The selected results provided to the user device have been selected so that inappropriate sensitive or offensive content is not shown to a user of the user device.

Innovative aspects of the subject matter described in this specification include, in some implementations, a computer-implemented method to perform actions. The actions include receiving a search query, obtaining a candidate set of search results that correspond to the search query, and obtaining an indication that the search query is classified as including query terms that (i) do not likely relate to a particular class of people, (ii) likely relate to the particular class of people, or (iii) likely relate to the particular class of people and include sensitive or offensive terms. The actions further include obtaining, for each search result in the candidate set of search results, an indication that the search result is classified as likely including (i) non-sensitive and non-offensive content, or (ii) sensitive or offensive content. From among the candidate set of search results, a presentation set of search results is selected based at least on (I) the indication that the search query is classified as including query terms that (i) are not likely related to the particular class of people, (ii) are likely related to the particular class of people, or (iii) are likely related to the particular class of people and include sensitive or offensive terms, and (II) the indication that the search result is classified as likely including (i) non-sensitive and non-offensive content, or (ii) sensitive or offensive content. The one or more search results of the presentation set of search results are provided for output in response to the search query.

In some implementations, a system includes one or more computers and one or more storage devices storing instructions that are operable and when executed by one or more computers, cause the one or more computers to perform actions. The actions include receiving a search query, obtaining a candidate set of search results that correspond to the search query, and obtaining an indication that the search query is classified as including query terms that (i) do not likely relate to a particular class of people, (ii) likely relate to the particular class of people, or (iii) likely relate to the particular class of people and include sensitive or offensive terms. The actions further include obtaining, for each search result in the candidate set of search results, an indication that the search result is classified as likely including (i) non-sensitive and non-offensive content, or (ii) sensitive or offensive content. From among the candidate set of search results, a presentation set of search results is selected based at least on (I) the indication that the search query is classified as including query terms that (i) are not likely related to the particular class of people, (ii) are likely related to the particular class of people, or (iii) are likely related to the particular class of people and include sensitive or offensive terms, and (II) the indication that the search result is classified as likely including (i) non-sensitive and non-offensive content, or (ii) sensitive or offensive content. The one or more search results of the presentation set of search results are provided for output in response to the search query.

In some implementations, a non-transitory computer-readable storage medium includes instructions, which, when executed by one or more computers, cause the one or more computers to perform actions. The actions include receiving a search query, obtaining a candidate set of search results that correspond to the search query, and obtaining an indication that the search query is classified as including query terms that (i) do not likely relate to a particular class of people, (ii) likely relate to the particular class of people, or (iii) likely relate to the particular class of people and include sensitive or offensive terms. The actions further include obtaining, for each search result in the candidate set of search results, an indication that the search result is classified as likely including (i) non-sensitive and non-offensive content, or (ii) sensitive or offensive content. From among the candidate set of search results, a presentation set of search results is selected based at least on (I) the indication that the search query is classified as including query terms that (i) are not likely related to the particular class of people, (ii) are likely related to the particular class of people, or (iii) are likely related to the particular class of people and include sensitive or offensive terms, and (II) the indication that the search result is classified as likely including (i) non-sensitive and non-offensive content, or (ii) sensitive or offensive content. The one or more search results of the presentation set of search results are provided for output in response to the search query.

In some implementations, the particular class of people includes a group of people having at least one demographic characteristic in common.

In some implementations, the sensitive or offensive terms include terms associated with one or more of pornography, violence, gore, and spoof. The sensitive or offensive content includes images, video, or data associated with one or more of pornography, violence, gore, and spoof.

In some implementations, the selection of the presentation set of search results from among the candidate set of search results includes one or more of the following actions. In some cases, a ranking of a search result in the candidate set of search results is reduced based on (i) the indication that the search query used to obtain the search result is classified as likely related to the particular class of people, and (ii) the indication that the search result is classified as likely including sensitive or offensive content. In some cases, a search result in the candidate set of search results is filtered to remove the search result from the presentation set of search results based on (i) the indication that the search query used to obtain the search result is classified as likely related to the particular class of people and including sensitive or offensive terms, and (ii) the indication that the search result is classified as likely including sensitive or offensive content. In some cases, a search result in the candidate set of search results is selected to be included in the presentation set of search results without modifying a ranking of the search result or filtering the search result based on the indication that the search query used to obtain the search result is classified as not likely related to a particular class of people and as likely including non-sensitive and non-offensive terms.

In some implementations, the selection of the presentation set of search results from among the candidate set of search results includes one or more of the following actions. In some cases, a search result in the candidate set of search results is selected to be included in the presentation set of search results without modifying a ranking of the search result or filtering the search result based on the indication that the search query used to obtain the search result is classified as not likely related to a particular class of people and as likely including sensitive or offensive terms. In some cases, a search result in the candidate set of search results is filtered to remove the search result from the presentation set of search results based on the indication that the search query used to obtain the search result is classified as likely related to the particular class of people and as likely including sensitive or offensive terms.

In some implementations, the actions of the computer-implemented method also include generating a relevance score for a document corresponding to each search result in the candidate set of search results, determining a ranking for each search result in the candidate set of search results, and receiving user session data that includes one or more attributes of a user device. The relevance score is indicative of a relevance of the document to the search query. The selection of the presentation set of search results from among the candidate set of search results further includes modifying rankings of one or more search results in the candidate set of search results based on the user session data that includes one or more attributes of the user device.

In some implementations, the selection of the presentation set of search results from among the candidate set of search results includes, for each document corresponding to a search result, assigning a label to the document based at least on the indication that the search result is classified as including sensitive or offensive content, and determining to filter the search result or modify the ranking of the search result based on the assigned label. The label is indicative of subject matter included in the document.

Other implementations of these aspects include corresponding systems, apparatus, computers, non-transitory computer-readable storage mediums, and computer programs, configured to implement the above-noted actions.

The details of one or more implementations are set forth in the accompanying drawings and the description below. Other features and advantages will become apparent from the description, the drawings, and the claims.

BRIEF DESCRIPTION OF THE DRAWINGS

Like reference numbers and designation in the various drawings indicate like elements.

DETAILED DESCRIPTION

This disclosure generally describes a method and system for applying classifiers to search queries and search results to provide a search experience in which users are protected from exposure to inappropriate offensive or sensitive content.

Figure 1:
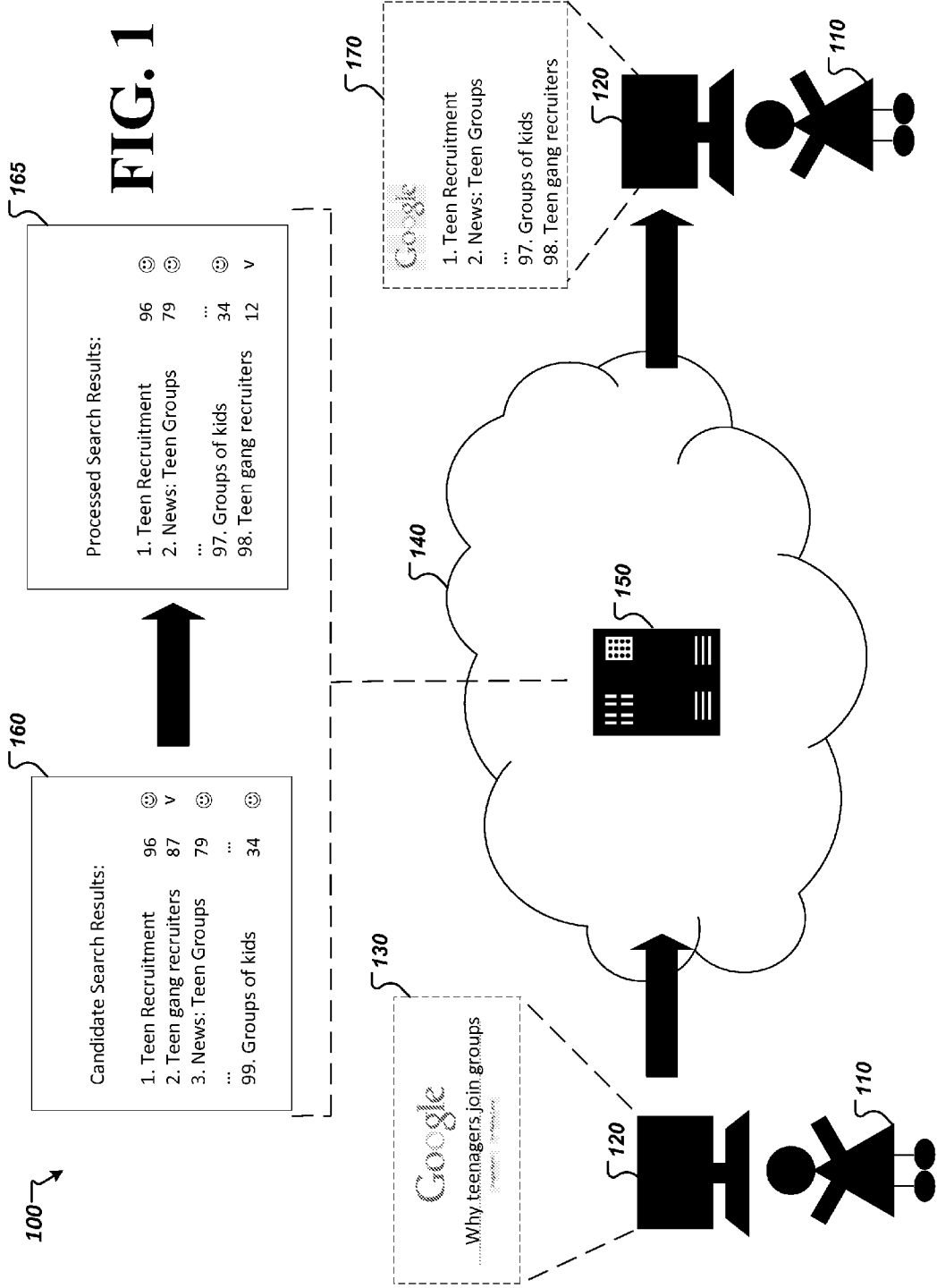
FIG. 1 depicts an exemplary implementation of safe search with a child user.
Figure 2:
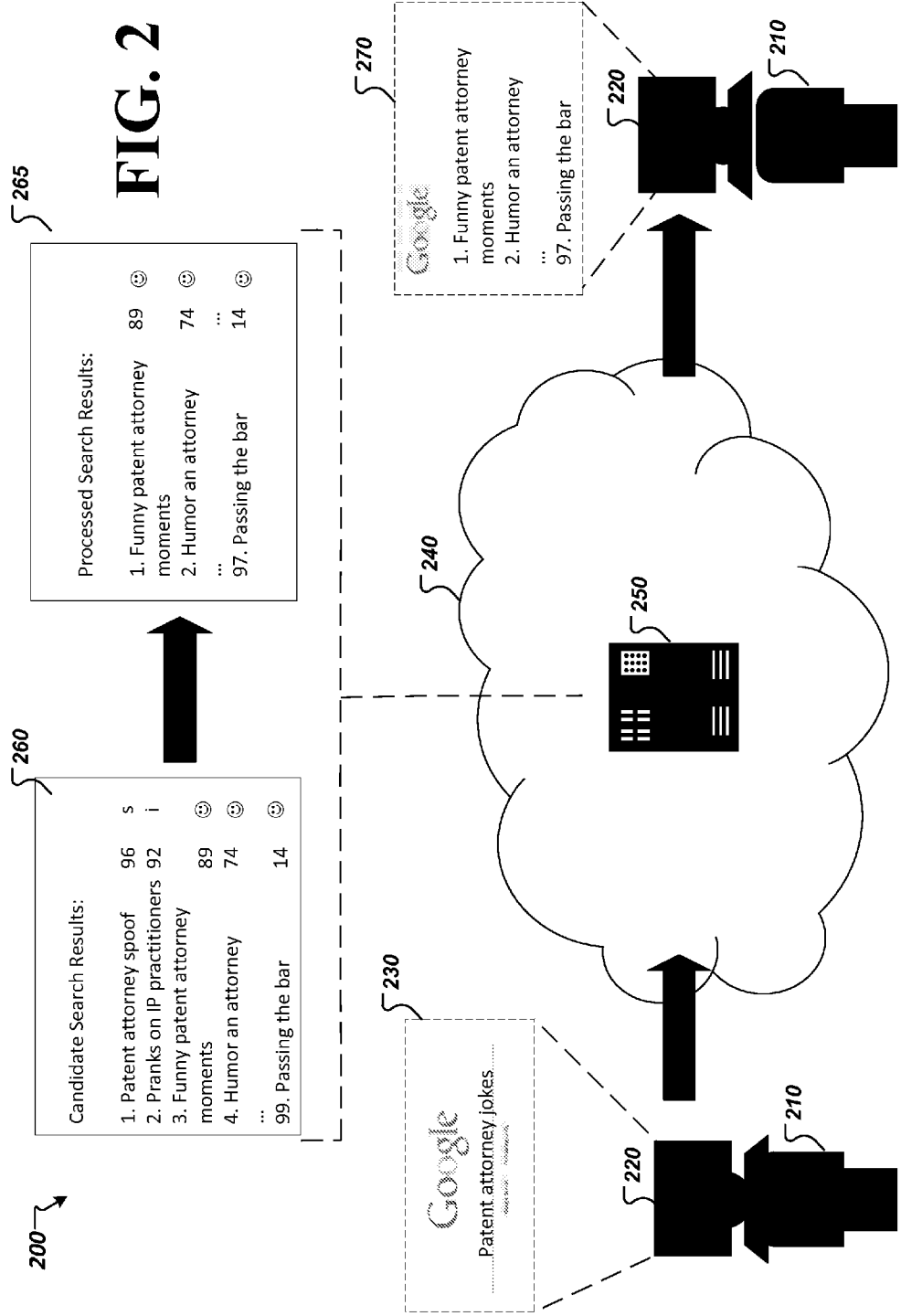
FIG. 2 depicts an exemplary implementation of safe search with an adult seeking inappropriate sensitive content.
Figure 3:
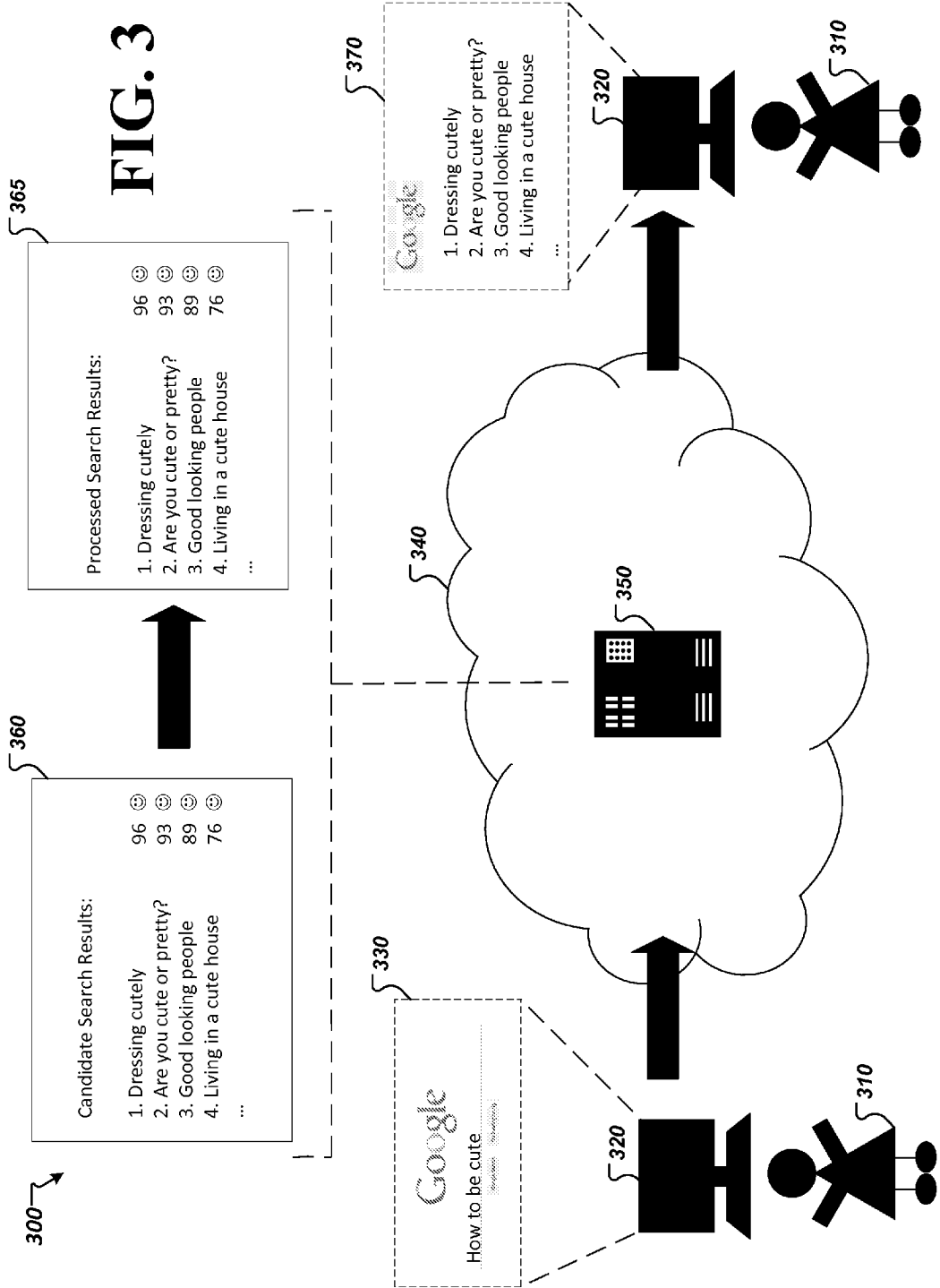
FIG. 3 depicts another exemplary implementation of safe search with a child user.
Figure 4:
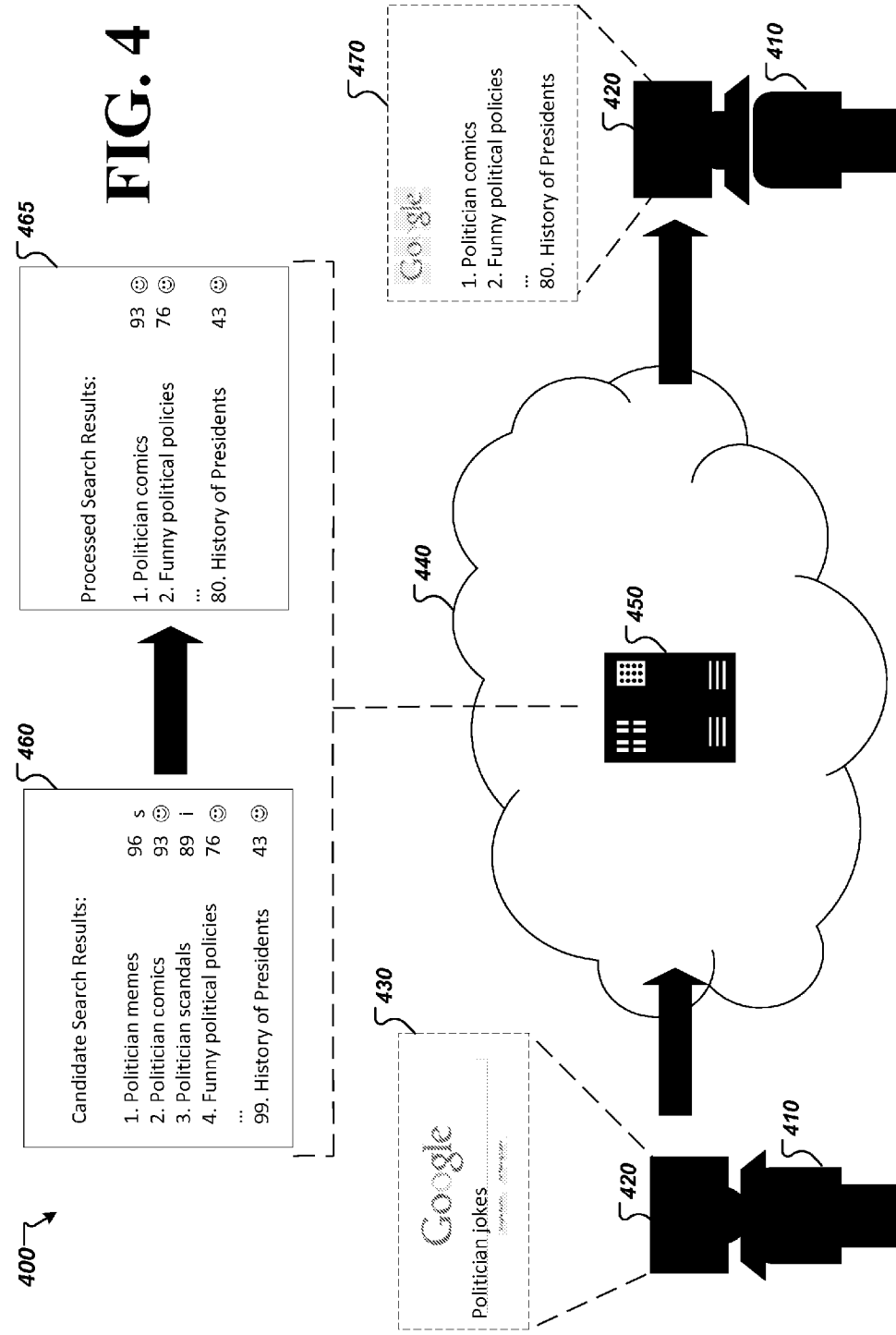
FIG. 4 depicts another exemplary implementation of safe search with an adult user.

FIGS. 1-4 depict exemplary scenarios illustrating a safe search experience according to implementations. In FIGS. 1 and 3, the user is a child user. A child user or children may refer to one or more people who are under the age of eighteen. In FIGS. 2 and 4, the user is an adult user. The adult user may have a history of seeking inappropriate sensitive or offensive content, and may be eighteen years or older.

Sensitive or offensive content may refer to, but is not limited to, pornography, gory images, and violent content. Inappropriate sensitive or offensive content may be a sub-category of the sensitive or offensive content, and may include various types of content including, but not limited to, content such as gang recruitment content, violence inciting content, content mocking a particular demographic group or inciting hatred against a particular demographic group, and spoof content. Inappropriate sensitive or offensive content may generally refer to any content that is illegal, abusive, or highly objectionable to a protected class of Internet users. The protected class of users may include any group of people having at least one demographic characteristic in common and for whom protection from inappropriate sensitive or offensive Internet content may be desired.

Referring to FIG. 1, a user 110 may utilize user device 120 to perform an Internet search using a search engine such as, for example, Google Search. The user 110 shown in FIG. 1 may be referred to as a child user 110. The user device 120 may receive a search query 130 such as "Why teenagers join groups" from the child user 110. The search query 130 is submitted to the search engine through one or more networks 140, which include one or more servers and processors 150. The search engine obtains a set of candidate search results 160 in response to receiving the search query 130.

The search engine receives a plurality of classification signals and selects a set of search results 165/170 from the set of candidate search results 160 for presenting to the child user 110 based on the classification signals. The classification signals may include a signal indicating one or more characteristics of search session data of the user device 120, a signal indicating a classification of one or more of the query terms in the search query 130, and a signal indicating that a sensitivity or offensive level of content in a search result document corresponding to a search result. Additional details of the classification signals and search engine method are provided below with reference to FIGS. 5 and 6.

In FIG. 1, the classification signals indicate that the search query 130 includes a term "teenagers" related to a protected class of people. Additionally, for each search result listed in the set of candidate search results 160, a relevance score indicative of the relevance of the search result document to the search query is provided, and a label indicative of at least a portion of content included in the search result document is assigned to each search result.

Referring to the set of candidate search results 160 in FIG. 1, a search result entitled "Teen Recruitment" is given a relevance score of 96 and assigned a label indicating that the search result document corresponding to "Teen Recruitment" includes content that can be presented to all users, including a child user 110, and does not include sensitive or offensive content.

The set of candidate search results 160 also includes: a search result entitled "Teen gang recruiters" with a relevance score of 87 and assigned a label "v" indicating that the search result document corresponding to "Teen gang recruiters" likely includes violent content or disturbing images; and search results entitled "News: Teen Groups" and "Groups of kids" with relevance scores of 79 and 34, respectively, and with assigned labels indicating that the search result documents corresponding to "News: Teen Groups" and "Groups of kids" likely include content that can be presented to all users, including a child user 110, and do not include sensitive or offensive content.

Based on the data provided by the above-noted classification signals, the search engine processes the candidate set of search results 160 to generate a new set of search results 165 to be presented to the child user 110. The new set of search results 165 may include results that have been re-ranked, removed, or selected based on the classification signals.

For example, in FIG. 1, the search result entitled "Teen gang recruiters" has been re-ranked to a lower ranking because the search query includes a term, e.g., teenagers, associated with a protected class of people and the search result document corresponding to "Teen gang recruiters" was determined to likely include violent content associated with teenagers; the search result entitled "Teen Recruitment" has been selected as the first ranked search result; and the search result entitled "News: Teen Groups" has been selected and moved up the search result rankings to a second rank since search results previously listed above the search result entitled "News: Teen Groups" were removed or ranked lower than the search result entitled "News: Teen Groups."

The selected set of search results 165 are then output as a presentation set of search results 170 at the user device 170 such that the child user 110 can enjoy a safe search experience without exposure to inappropriate sensitive or offensive content.

In another example 200 shown in FIG. 2, the user is an adult user 210, who submits a search query 230 "Patent Attorney jokes" through user device 220. The search query 230 is sent to a search engine through one or more networks 240 that include one or more servers and processors 250.

The search engine obtains a set of candidate search results 260 in response to receiving the search query 230.

As shown in FIG. 2, the set of candidate search results 260 include, among a plurality of results: (i) a search result entitled "Patent attorney spoof" with a relevance score of 96 and a label indicating that the document associated with the search result entitled "Patent attorney spoof" likely includes inappropriate sensitive or offensive content such as spoof content associated with a protected class of people (e.g., patent attorneys); (ii) a search result entitled "Pranks on IP practitioners" with a relevance score of 92 and a label indicating that the document associated with the search result entitled "Pranks on IP practitioners" likely includes inappropriate sensitive or offensive content such as insulting jokes directed to a protected class of people; (iii) a search result entitled "Funny patent attorney moments" with a relevance score of 89 and a label indicating that the document associated with the search result entitled "Funny patent attorney moments" does not likely include any sensitive or offensive content; and (iv) a search result entitled "Humor an attorney" with a relevance score of 74 and a label indicating that the document associated with the search result entitled "Humor an attorney" does not likely include any sensitive or offensive content.

The search engine processes the set of candidate search results 260 based on one or more classification signals and selects a set of search results 265 in which search results entitled "Patent attorney spoof" and "Pranks on IP practitioners" have been removed because they likely include inappropriate sensitive or offensive content, and the remaining search results have been re-ranked.

The selected set of search results 265 are then output as a presentation set of search results 270 at the user device 270 such that the adult user 210 does not access inappropriate sensitive or offensive content.

In another example 300 shown in FIG. 3, the user is a child user 310, who submits a search query 330 through user device 320 to search for content related to "How to be cute" The search query 330 is sent to a search engine through one or more networks 340 that include one or more servers and processors 350. The search engine obtains a set of candidate search results 360 in response to receiving the search query 330.

As shown in FIG. 3, the set of candidate search results 360 includes, among a plurality of results: a search result entitled "Dressing cutely" with a relevance score of 96 and a label indicating that the document associated with the search result does not likely include any sensitive or offensive content; a search result entitled "Are you cute or pretty?" with a relevance score of 93 and a label indicating that the document associated with the search result does not likely include any sensitive or offensive content; a search result entitled "Good looking people" with a relevance score of 89 and a label indicating that the document associated with the search result does not likely include any sensitive or offensive content; and a search result entitled "Living in a cute house" with a relevance score of 76 and a label indicating that the document associated with the search result does not likely include any sensitive or offensive content.

The search engine processes the set of candidate search results 360 based on one or more classification signals and selects a set of search results 365. Because all the search results in the set of candidate search results 360 include results that are not likely to include sensitive or offensive content and because terms in the search query are not associated with a protected class of people, all the search results in the set of candidate search results 360 can be selected and provided to user 310 as a presentation set of search results 370 through user device 320.

In another example 400 shown in FIG. 4, the user is an adult user 410, who submits a search query 430 through user device 420 to search for content related to "Politician jokes." The search query 430 is sent to a search engine through one or more networks 440 that include one or more servers and processors 450. The search engine obtains a set of candidate search results 460 in response to receiving the search query 430.

In FIG. 4, the set of candidate search results 460 includes, among a plurality of results: a search result entitled "Politician memes" with a relevance score of 96 and a label indicating that the document associated with the search result potentially includes at least some sensitive or offensive content (e.g., potentially derogatory or hateful content associated with politicians); a search result entitled "Politician comics" with a relevance score of 93 and a label indicating that the document associated with the search result does not likely include any sensitive or offensive content; a search result entitled "Politician scandals" with a relevance score of 89 and a label indicating that the document associated with the search result may potentially include inappropriate sensitive or offensive content (e.g., violent or disturbing images); a search result entitled "Funny political policies" with a relevance score of 76 and a label indicating that the document associated with the search result does not likely include any sensitive or offensive content; and a search result entitled "History of Presidents" with a relevance score of 43 and a label indicating that the document associated with the search result does not likely include any sensitive or offensive content. In the example shown in FIG. 4, the user is an adult user 410, and the search engine receives a classification signal indicating that a search session associated with user device 420 includes previously submitted search queries (e.g., "politician spoof content") for inappropriate sensitive or offensive content within a determined time period.

The search engine processes the set of candidate search results 460 based on classification signals and selects a set of search results 465. In particular, search results entitled "Politician memes" and "Politician scandals" have not been selected in the selected set of search results 465 because at least one classification signal includes data derived from search session data that indicates a likely interest in inappropriate sensitive or offensive content such as spoof content associated with politicians and because documents associated with these search results likely include at least some inappropriate sensitive or offensive content. Other search results in the set of candidate search results 460 may be re-ranked.

The selected set of search results 465 are then output as a presentation set of search results 470 at the user device 420 such that inappropriate sensitive or offensive content is not presented. In some implementations, if a classification signal that includes data from session data indicating a likely interest in inappropriate sensitive or offensive content was not received, some search results that were not output as a result of receiving this classification signal, e.g., "Politician memes," may have been included in the selected set of search results 465.

Figure 5:
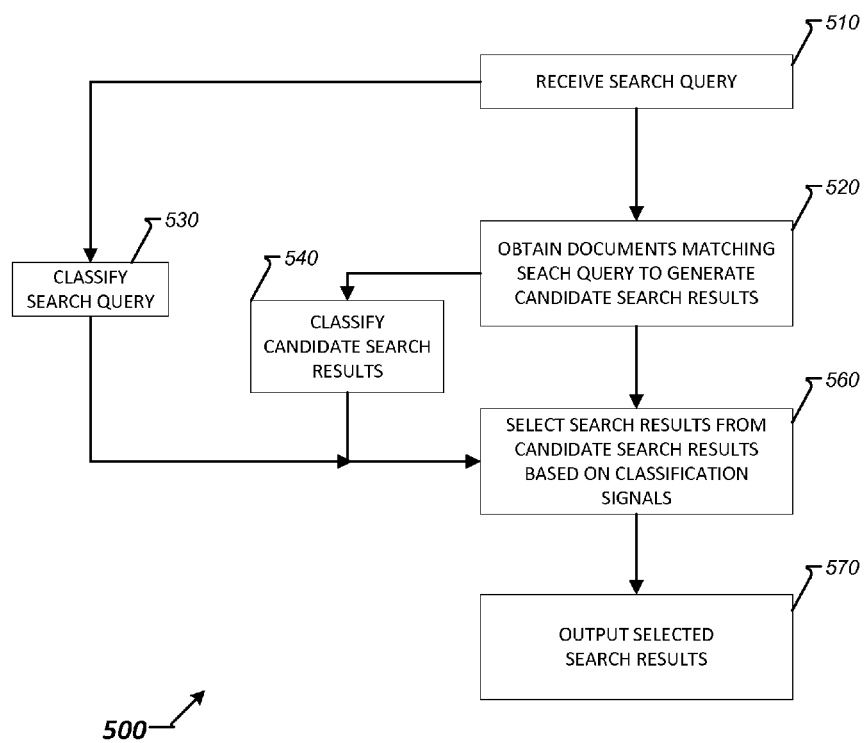
FIG. 5 depicts a flowchart illustrating a method for providing safe search.
Figure 6:
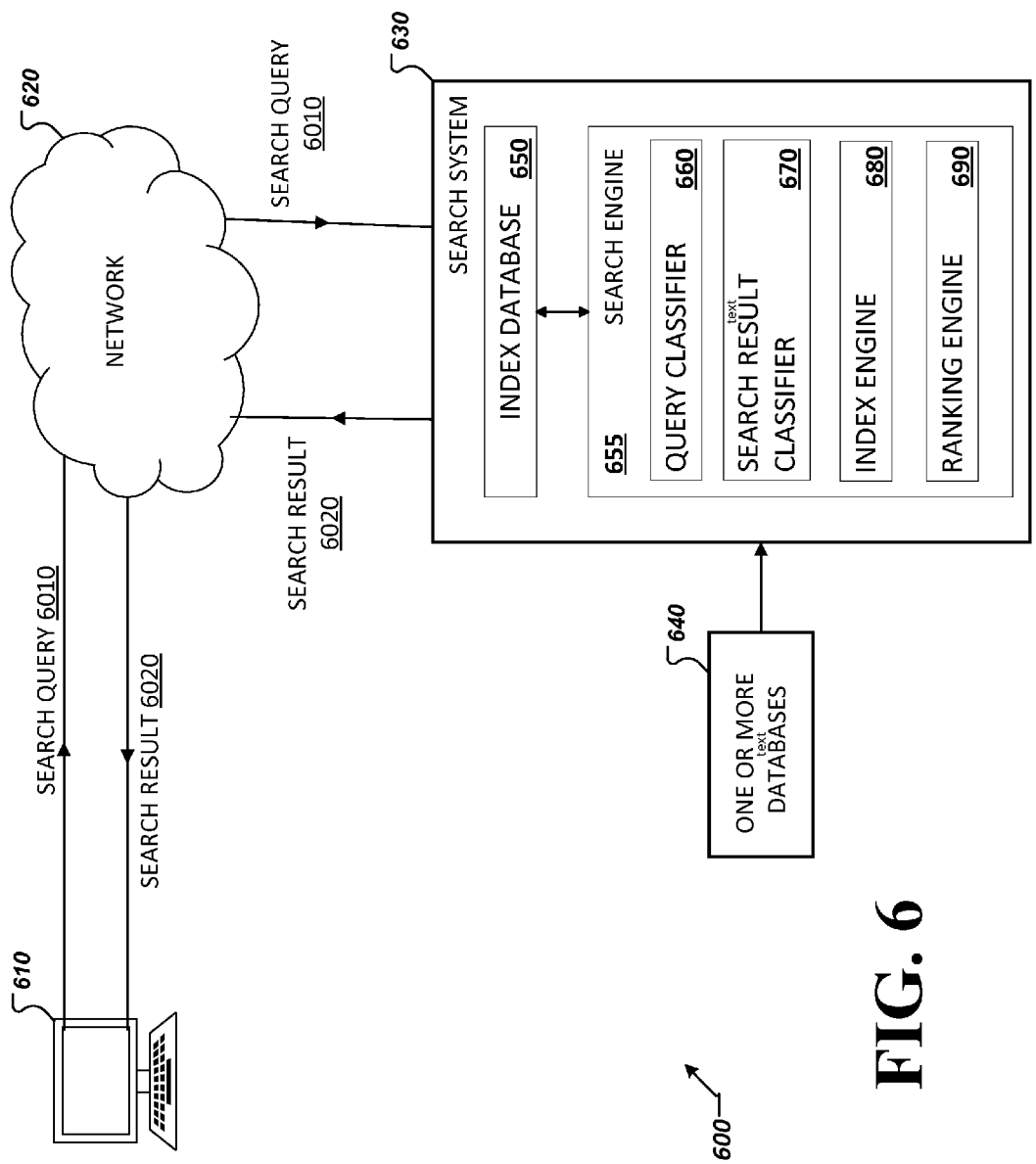
FIG. 6 depicts a block diagram illustrating a safe search system to limit access to inappropriate sensitive or offensive content.

The method and system for implementing the examples depicted in FIGS. 1-4 are described in further detail in FIGS. 5 and 6. FIG. 5 depicts a flowchart illustrating a method for providing safe search. FIG. 6 depicts a block diagram illustrating a safe search system.

Referring to FIG. 5, a search engine may receive a search query input by a user via a user device (510). The search query includes one or more query terms, and may be received from the user device.

In response to receiving the search query, the search engine obtains documents matching the search query to generate a set of candidate search results (520). Various suitable methods and techniques, including one or more of, for example, keyword matching, metadata matching, ranking, and indexing, may be used to obtain the matching documents and generate the set of candidate search results. For instance, a ranking engine may be used to rank each search result in the set of candidate search results based on the relevance of a search result document to the search query.

A presentation set of search results is selected from the set of candidate search results based on classification signals (560). The selection of the presentation set of search results may include actions of selecting a search result that is included in the set of candidate search results, removing a search result that is included in the set of candidate search results, and decreasing or increasing a ranking of a search result that is included in the set of candidate search results.

The classification signals may be provided by various suitable classifiers and databases. The classifiers may include at least a search query classifier and a search result classifier. The databases may include, for example, a session database that stores data indicative of a user device's Internet browsing activity in a session. The session database may store data associated with the Internet browsing activities of the user device or attributes of the user device without storing identification information of the user. For example, information regarding user device attributes (e.g., information about search queries submitted during a search session or sites visited during a browsing session, URLs clicked on by a user of the user device) may be treated in one or more ways before it is stored or used, so that personally identifiable information is removed. As an example, a user's identification information associated with the user device may be treated so that no personally identifiable information can be determined for the user, or a user's geographic location may be generalized where location information is obtained (such as to a city, ZIP code, or state level), so that a particular location of a user cannot be determined.

After a search query is received (510), the search query classifier classifies the search query (530). In particular, the search query classifier classifies a search query as likely: (i) not including a term associated with a protected class of people and not including a term associated with sensitive or offensive content; (ii) not including a term associated with a protected class of people and including one or more terms associated with sensitive or offensive content; (iii) including one or more terms associated with a protected class of people and not including any terms associated with sensitive or offensive content; and (iv) including one or more terms associated with a protected class of people and including one or more terms associated with sensitive or offensive content. As described above, the protected class of people may be selected by an administrator of a search engine according to one or more rules, and may refer to any group of people for whom protection from inappropriate sensitive or offensive Internet content may be desired.

Training data can be used to train the search query classifier to classify terms as being associated with one or more protected classes of people or with sensitive or offensive content. For example, search query classifier may be trained to identify terms search as "teen," "teenager," "kindergarten," and "infant" as belonging to a "child" protected class of people. Terms such as "gun," "rifle," and "gang" may be classified as corresponding to sensitive or offensive content. It should be understood that various terms can be classified as being associated with one or more protected classes of people, and that various terms can be classified as corresponding to sensitive or offensive content. Terms can be classified as being associated with one or more protected classes of people or to sensitive or offensive content by using various suitable methods. For example, in some cases, tags on search result documents obtained in response to queries including a particular term can be analyzed to determine the subject matter that the particular term is likely to be associated with. In some cases, the training data may be verified by a human reviewer.

In some implementations, multiple search logs can be analyzed to determine particular terms that co-occur with a term that is known to be used to search for inappropriate sensitive or offensive content, and such particular terms may then be designated as queries that are likely associated with inappropriate sensitive or offensive content. For instance, if a query such as "Politician memes" co-occurs with a query (e.g., "politician spoof content") that is known to be used to search for inappropriate sensitive or offensive content within a determined time period for a number of times that is greater than a particular threshold, the query "Politician memes" may also be determined as seeking inappropriate sensitive or offensive content.

The following classifications are examples of search query classification by the search query classifier. For example, search queries including terms such as "the life of a patent," "soccer," "world cup 2014," or "email" may be classified as likely not including a term associated with a protected class of people and likely not including any sensitive or offensive terms. Search queries including terms such as "nude art" and "top gun" may be classified as likely not including a term associated with a protected class of people but likely including one or more sensitive or offensive terms. Search queries including terms such as "teenagers" or "students" may be classified as likely including one or more terms associated with a protected class of people, e.g., teenagers, but likely not including any terms associated with sensitive or offensive content. Search queries including terms such as "Politician spoof content" may be classified as likely including one or more terms associated with a protected class of people, e.g., politicians, and likely including one or more terms associated with inappropriate sensitive or offensive content.

Another classification signal is received from a search result classifier. Search results included in the set of candidate search results are classified by the search result classifier, which classifies search result documents, e.g., web documents, corresponding to the search results included in the set of candidate search results, as likely including sensitive or offensive content or as likely not including sensitive or offensive content. Training data, which can be verified by a human reviewer, can be used to train the search result classifier to classify search result documents as likely including sensitive or offensive content according to various suitable methods.

In some implementations, the search result classifier may execute various suitable image processing or classification methods to determine a likely nature or type of image in a search result document. For instance, one or more images in a search result document may be classified as likely being related to pornography, violence, drugs, spoof, etc.

In some implementations, the search result classifier may execute various suitable keyword matching methods to determine whether metadata, image tags, uniform resource locators (URLs), or any content on a web page likely includes terms associated with pornography, violence, drugs, spoof, etc.

In some implementations, the search result classifier may include one or more particular subject matter classifiers, such as, for example, a pornography classifier, a violence classifier, a spoof classifier, a drugs classifier, etc. These particular subject matter classifiers are configured to determine whether or not search result documents are likely to include the corresponding particular subject matter. For example, the search result classifier may include a violence classifier to determine whether or not a search result document likely includes disturbing or violence-related content.

Using one or more of the various classification techniques and classifiers noted above, the search result classifier may determine the subject matter that is likely present in a search result document. After determining the likely subject matter, the search result classifier may use a threshold to classify a search result document. For instance, if a search result document recites the word "gun" only once, the search result document may not satisfy a violent content threshold and the search result document may not be classified as likely including sensitive or offensive content. In another example, if a search result document recites the word "gun" one hundred times, the search result document may satisfy the violent content threshold and the search result document may be classified as likely including sensitive or offensive content.

It should be understood that the threshold used by the search result classifier may vary according to subject matter. For instance, the threshold for spoof content in the examples described above may be, for example, 50 recitations of a term associated with spoof content. However, the threshold for gang violence may be much lower. For instance, fewer than ten recitations of terms associated with gang violence may satisfy the gang violence threshold. The thresholds may be set by an administrator of the search engine or may be configured using training data. Furthermore, although a count of words is used in the examples described above, it should be understood that the thresholds used by the search result classifier may be based on any combination of data statistics, e.g., counts of words, images, links, tags, etc.

In addition, it should be understood that a search result document may include a plurality of different types of content and that the search result classifier may classify the search result document as likely including the different types of content.

After determining whether a search result document satisfies a threshold and classifying the search result document (540), the search result classifier generates a classification signal with data indicating whether or not the search result document likely includes sensitive or offensive content.

Another classification signal may be received from one or more databases such as a session database. The session database may store data associated with the Internet browsing activities without storing identification information of a user of the user device as described above.

In particular, the session database stores data indicative of a user device's Internet browsing activity in a search session. The session database may cache data associated with a search log of one or more of previous queries submitted by the user device in the same session as the received query in 510 and data associated with previous links clicked on by the user in the same session. The cached data may be used to determine a likely topic of interest in a search session.

For example, if search session data indicates that multiple queries for illegal drugs-related content were submitted within a determined time period of a received query in 510, a classification signal may be generated indicating that a likely topic of interest in the current search session is illegal drugs. Accordingly, queries co-occurring with the received query in 510 in a determined time period may be used to determine a likely topic of interest in a search session. The determined time period may be any suitable time period, e.g., 5 minutes, 10 minutes, set by an administrator of the search engine.

In some implementations, the databases may also include a user device database that includes profile data of user devices. The profile data may include, for example, data indicative of settings and preferences of a user device. For example, a user device profile may include information indicating whether a user of the user device has activated a safe search setting for browsing the internet. The safe search setting may indicate that a user of the user device would like to block or stop receiving sensitive or offensive content at the user device. Based on a user device's profile, search results that can be received by the user device may be filtered. A classification signal including data indicative of the user device profile may be generated.

One or more classification signals sent from the databases may be generated by a processor coupled to the databases, and are provided to the search engine to be used in selecting the presentation set of search results.

Based on the classification signals received from the search query classifier and the search result classifier, and, in some cases, the databases, a presentation set of search results is selected from the set of candidate search results (560). Search results in the set of candidate search results may be re-ranked, removed, or selected based on the classification signals as explained in further detail below. Each search result in the set of candidate search results may be associated with a search result document and a search query in response to which the set of candidate search results is generated.

A search result that is (i) associated with a search query that is classified as likely not being related to a protected class of people, and (ii) associated with a search result document that is classified as likely not including sensitive content, is selected to be included in the presentation set of search results.

A search result that is (i) associated with a search query that is classified as likely not being related to a protected class of people, and (ii) associated with a search result document that is classified as likely including sensitive content, is selected to be included in the presentation set of search results.

A search result that is (i) associated with a search query that is classified as likely related to a protected class of people and not including a sensitive term, and (ii) associated with a search result document that is classified as likely including sensitive content, is selected, but re-ranked to a significantly lower ranking in the presentation set of search results.

A search result that is (i) associated with a search query that is classified as likely related to a protected class of people and not including a sensitive term, and (ii) associated with a search result document that is classified as likely not including sensitive content, is selected to be included in the presentation set of search results.

A search result that is (i) associated with a search query that is classified as likely related to a protected class of people and including a sensitive term, and (ii) associated with a search result document that is classified as likely including sensitive content, is removed and is not selected for the presentation set of search results.

A search result that is (i) associated with a search query that is classified as likely related to a protected class of people and including a sensitive term, and (ii) associated with a search result document that is classified as likely not including sensitive content, is selected to be included in the presentation set of search results.

In some implementations, the selected search results may be further processed based on one or more classification signals received from the databases. In particular, if a classification signal received from the databases includes data indicating that a safe search setting is activated, that a likely topic of interest in the current search session includes inappropriate sensitive or offensive content, or that the search query co-occurs with a query known to be seeking inappropriate sensitive or offensive content, the search engine may further process the search results so that any search result with likely inappropriate sensitive or offensive content is not shown to the user.

For example, a user device associated with a search session in which the likely topic of interest is spoof content associated with a particular demographic group may not be provided search results with likely inappropriate jokes or other abusive content associated with the particular demographic group. As described above, a likely topic of interest in a search session can be determined from data stored in the search session database.

In some cases, no search results may remain as a result of removing or filtering search results in the set of candidate search results based on the classification signals. In these cases, a message may be shown to the user indicating that no search results are available. In some implementations, a suggestion that includes a modified search query may be provided to the user. The suggestion for the modified search query may include a query without terms that are classified as being related to a protected class of people and including a sensitive term. The user may select the modified search query and a new search may be conducted returning the method for providing safe search to (510). In some cases, the modified search query may automatically be selected without any user input, and a new search based on the modified search query may be conducted returning the method for providing safe search to (510).

In some cases, only a small number (e.g., less than 10) of search results may remain as a result of removing or filtering search results in the set of candidate search results based on the classification signals. In these cases, a suggestion that includes a modified search query may be provided to the user. The suggestion for the modified search query may include a query without terms that are classified as being related to a protected class of people and including a sensitive term. The user may select the modified search query and a new search may be conducted returning the method for providing safe search to (510). As noted above, in some cases, a modified search may be executed using the modified search query without receiving any user input.

After selecting a presentation set of search results (560), the presentation set of results is output to be provided to the user (570). The search results provided do not include inappropriate sensitive or offensive content and therefore provide a safe search experience for users. A system 600 for implementing this safe search method is described with reference to FIG. 6.

Referring to FIG. 6, a user may access a search system 630 via network 620 using a user device 610. The search system 630 may also be connected to one or more databases 640. In some implementations, the one or more databases 640 may be integrated with the search system 630.

User device 610 may be any suitable electronic device such as a personal computer, a mobile telephone, a smart phone, a smart watch, a smart TV, a mobile audio or video player, a game console, or a combination of one or more of these devices. In general, the user device 610 may be a wired or wireless device capable of browsing the Internet and providing a user with search results.

The user device 610 may include various components such as a memory, a processor, a display, and input/output units. The input/output units may include, for example, a transceiver which can communicate with network 620 to send one or more search queries 6010 and receive one or more search results 6020. The display may be any suitable display including, for example, liquid crystal displays, light emitting diode displays. The display may display search results 6020 received from the search system 630.

The network 620 may include one or more networks that provide network access, data transport, and other services to and from user device 610. In general, the one or more networks may include and implement any commonly defined network architectures including those defined by standards bodies, such as the Global System for Mobile communication (GSM) Association, the Internet Engineering Task Force (IETF), and the Worldwide Interoperability for Microwave Access (WiMAX) forum. For example, the one or more networks may implement one or more of a GSM architecture, a General Packet Radio Service (GPRS) architecture, a Universal Mobile Telecommunications System (UMTS) architecture, and an evolution of UMTS referred to as Long Term Evolution (LTE). The one or more networks may implement a WiMAX architecture defined by the WiMAX forum or a Wireless Fidelity (WiFi) architecture. The one or more networks may include, for instance, a local area network (LAN), a wide area network (WAN), the Internet, a virtual LAN (VLAN), an enterprise LAN, a layer 3 virtual private network (VPN), an enterprise IP network, or any combination thereof.

The one or more networks may include one or more of databases, access points, servers, storage systems, cloud systems, and modules. For instance, the one or more networks may include at least one server, which may include any suitable computing device coupled to the one or more networks, including but not limited to a personal computer, a server computer, a series of server computers, a mini computer, and a mainframe computer, or combinations thereof. The at least one server may be a web server (or a series of servers) running a network operating system, examples of which may include but are not limited to Microsoft® Windows® Server, Novell® NetWare®, or Linux®. The at least one server may be used for and/or provide cloud and/or network computing. Although not shown in the figures, the server may have connections to external systems providing messaging functionality such as e-mail, SMS messaging, text messaging, and other functionalities, such as advertising services, search services, etc.

In some implementations, data may be sent and received using any technique for sending and receiving information including, but not limited to, using a scripting language, a remote procedure call, an email, an application programming interface (API), Simple Object Access Protocol (SOAP) methods, Common Object Request Broker Architecture (CORBA), HTTP (Hypertext Transfer Protocol), REST (Representational State Transfer), any interface for software components to communicate with each other, using any other known technique for sending information from a one device to another, or any combination thereof.

The one or more databases 640 may include various types of database, including a cloud database or a database managed by a database management system (DBMS). A DBMS may be implemented as an engine that controls organization, storage, management, and retrieval of data in a database. DBMSs may provide the ability to query, backup and replicate, enforce rules, provide security, do computation, perform change and access logging, and automate optimization. A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. Data structures can include fields, records, files, objects, and any other applicable known or convenient structures for storing data. A DBMS may also include metadata about the data that is stored.

In some implementations, the one or more databases 640 may include one or more of a session database and a user device database. As described above, the session database may store data indicative of the Internet browsing activity in a search session. The session database may cache data indicative of previous queries submitted in the same session as a currently received query and data associated with previous links clicked on by a user of the user device in the same session. The cached data may be used to determine user device attributes or a likely topic of interest for a search session. The user device database may include profiles of user devices. The profile may include, for example, data indicative of preferences or settings associated with the user device.

As described above, based on the user device's profile or queries co-occurring with a currently received query in a determined time period of a search session, a processor coupled to the one or more databases 640 may determine a likely topic of interest for a current search session. The processor may generate and send one or more classification signals including data indicative of the likely topic of interest to the search system 630 to be used for selecting a presentation set of search results.

The search system 630 can be implemented, at least in part, as, for example, computer script running on one or more servers in one or more locations that are coupled to each other through network 620. The search system 630 includes an index database 650 and a search engine 655, which includes a search query classifier 660, a search result classifier 670, an index engine 680, and a ranking engine 690.

The index database 650 stores indexed resources found in a corpus, which is a collection or repository of resources. The resources may include, for example, documents such as web pages, images, or news articles. In some implementations, the resources may include resources on the Internet. While one index database 650 is shown, in some implementations, multiple index databases can be built and used.

The index engine 680 indexes resources in the index database 650 using any suitable technique. In some implementations, the index engine 680 receives information about the contents of resources, e.g., tokens appearing in the resources that are received from a web crawler, and indexes the resources by storing index information in the index database 650.

The search engine 655 uses the index database 650 to identify resources that match a search query 6010 to generate, for example, a set of candidate search results and a presentation set of search results. The ranking engine 690 ranks resources that match the search query 6010. The ranking engine 690 may rank the resources using various suitable techniques and criteria. For example, in some cases, the ranking engine may rank resources based on the relevancy of the resources to terms in the search query 6010. The ranking engine 690 may also modify the rankings of search results in the set of candidate search results and provide the modified rankings for use in the presentation set of search results.

The search query classifier 660 may include one or more classifiers. As described above, the search query classifier 660 classifies a search query 6010 as likely: (i) not including a term associated with a protected class of people and not including a term associated with sensitive or offensive content; (ii) not including a term associated with a protected class of people and including one or more terms associated with sensitive or offensive content; (iii) including one or more terms associated with a protected class of people and not including any terms associated with sensitive or offensive content; and (iv) including one or more terms associated with a protected class of people and including one or more terms associated with sensitive or offensive content. The protected class of people may be selected by an administrator of the search system 630 according to one or more rules, and may refer to any group of people having at least one demographic characteristic in common and for whom protection from inappropriate sensitive or offensive Internet content may be desired. The search query classifier 660 generates a classification signal indicative of a classification of the search query 6010, and provides the classification signal to the search engine 655.

The search query classifier 660 is trained using training data to classify a term included in a search query 6010 as being associated with one or more protected classes of people or with sensitive or offensive content. For example, the search query classifier 660 may be trained to identify terms search as "teen," "teenager," "kindergarten," and "infant" as belonging to a "child" protected class of people. Terms such as "gun," "rifle," and "gang" may be classified as corresponding to sensitive or offensive content. It should be understood that various terms can be classified as being associated with one or more protected classes of people, and that various terms can be classified as corresponding to sensitive or offensive content. In some cases, the training data may be verified by a human reviewer.

The search result classifier 670 classifies search results included in the set of candidate search results provided by the index database 650 as likely including sensitive or offensive content or as likely not including sensitive or offensive content. As described above, one or more classifiers and methods of classification may be used to search results included in the set of candidate search results provided by the index database 650. For instance, the search result classifier 670 may include particular subject matter classifiers and may execute various methods such as image classification methods and keyword matching methods to classify search result documents associated with search results. The search result classifier 670 may determine the likely subject matter included in a search result document and use a threshold to classify the search result document. In some implementations, the threshold may vary for different subject matters.

The search result classifier 670 generates a classification signal with data indicating whether or not the search result document is likely to include sensitive or offensive content. Search results may be assigned a label or probability score according to the classification signal. For instance, referring to the set of candidate search results 160 shown in FIG. 1, a search result entitled "News: Teen Groups" is assigned a label "☺" indicating that the search result document corresponding to "News: Teen Groups" is classified as likely not to include sensitive or offensive content; and a search result entitled "Teen Gang recruiters" is assigned a label "v" indicating that the search result document corresponding to "Teen Gang recruiters" is classified as likely to include sensitive or offensive content, such as violent content or disturbing images.

In some implementations, the search engine 655 receives classification signals from the search query classifier 660 and the search result classifier 670. In some implementations, the search engine 655 receives classification signals from the search query classifier 660, the search result classifier 670, and one or more databases 640. Based on the classification signals, the search engine 655 selects search results from the set of candidate search results to be included in the presentation set of search results to be sent to the user device 610. The selection by the search engine 655 may include removing, selecting, or changing a ranking of a search result in the set of candidate search results as described above.

The search engine 655 transmits one or more search results 6020 through the network 620 to the user device 610. The search results 6020 transmitted to the user device 610 include the presentation set of search results generated according to the method described in FIG. 5 and shown in the examples of FIGS. 1-4. It should be understood that the search results 6020 transmitted to the user device 10 may include various types of information associated with each search result. For instance, the information associated with each search result may include one or more of a web link to a resource, a description of the resource, a preview of the resource, a title of the resource, and an image associated with the resource. The search results 6020 may also include suggestions for related search queries, related images, advertisements, or information and offers that may be of interest to the user.

An exemplary implementation of the system 600 is described as follows. A user may connect to the search system 630 through user device 610 and network 620 to submit a search query 6010. After receiving the search query 6010, the search system 630 generates a set of candidate search results provided by the index database 650, classifies the search query, classifies and ranks the search results in the set of candidate search results, modifies the set of candidate search results according to the classifications to generate a presentation set of search results, and responds to the search query 6010 with search results 6020 that include the presentation set of search results. The search results 6020 are transmitted through the network 620 to the user device 610 in a form that can be presented to the user (e.g., as a search results web page to be displayed in a web browser running on the user device 610).

Embodiments and all of the functional operations and/or actions described in this specification may be implemented in digital electronic circuitry, or in computer software, firmware, or hardware, including the structures disclosed in this specification and their structural equivalents, or in combinations of one or more of them. Embodiments may be implemented as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Moreover, a computer may be embedded in another device, e.g., a tablet computer, a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on one or more computers having a display device, e.g., a cathode ray tube (CRT), liquid crystal display (LCD), or light emitting diode (LED) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while actions are depicted in the drawings in a particular order, this should not be understood as requiring that such actions be performed in the particular order shown or in sequential order, or that all illustrated actions be performed, to achieve desirable results. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims.

For example, the actions recited in the claims may be performed in a different order and still achieve desirable results.

What is claimed is:

1. A computer-implemented method comprising:
receiving a search query;
obtaining a candidate set of search results that correspond to the search query;
obtaining an indication that the search query is classified as including query terms that (i) do not likely relate to a particular class of people, (ii) likely relate to the particular class of people, or (iii) likely relate to the particular class of people and include sensitive or offensive terms;
obtaining, for each search result in the candidate set of search results, an indication that the search result is classified as likely including (i) non-sensitive and non-offensive content, or (ii) sensitive or offensive content;
generating a relevance score for a document corresponding to each search result in the candidate set of search results, the relevance score being indicative of a relevance of the document to the search query;
determining a ranking for each search result in the candidate set of search results;
receiving user session data that include one or more attributes of a user device;
selecting, from among the candidate set of search results, a presentation set of search results based at least on (I) the indication that the search query is classified as including query terms that (i) are not likely related to the particular class of people, (ii) are likely related to the particular class of people, or (iii) are likely related to the particular class of people and include sensitive or offensive terms, and (II) the indication that the search result is classified as likely including (i) non-sensitive and non-offensive content, or (ii) sensitive or offensive content, wherein selecting, from among the candidate set of search results, the presentation set of search results comprises:
modifying rankings of one or more search results in the candidate set of search results based on the user session data that includes the one or more attributes of the user device; and
for each document corresponding to a search result:
assigning a label to the document based at least on the indication that the search result is classified as including sensitive or offensive content, the label being indicative of subject matter included in the document; and
determining to filter the search result or modify the ranking of the search result based on the assigned label; and
providing one or more search results of the presentation set of search results for output in response to the search query.

2. The computer-implemented method of claim 1, wherein the particular class of people includes a group of people having at least one demographic characteristic in common.

3. The computer-implemented method of claim 1, wherein the sensitive or offensive terms include terms associated with one or more of pornography, violence, gore, and spoof, and
wherein the sensitive or offensive content includes images, video, or data associated with one or more of pornography, violence, gore, and spoof.

4. A computer-implemented method comprising:
receiving a search query;
obtaining a candidate set of search results that correspond to the search query;
obtaining an indication that the search query is classified as including query terms that (i) do not likely relate to a particular class of people, (ii) likely relate to the particular class of people, or (iii) likely relate to the particular class of people and include sensitive or offensive terms;
obtaining, for each search result in the candidate set of search results, an indication that the search result is classified as likely including (i) non-sensitive and non-offensive content or (ii) sensitive or offensive content;
selecting, from among the candidate set of search results, a presentation set of search results based at least on (I) the indication that the search query is classified as including query terms that (i) are not likely related to the particular class of people, (ii) are likely related to the particular class of people, or (iii) are likely related to the particular class of people and include sensitive or offensive terms, and (II) the indication that the search result is classified as likely including (i) non-sensitive and non-offensive content, or (ii) sensitive or offensive content, wherein selecting, from among the candidate set of search results, the presentation set of search results comprises one or more of:
reducing a ranking of a search result in the candidate set of search results based on (i) obtaining the indication that the search query used to obtain the search result is classified as likely related to the particular class of people, and (ii) obtaining the indication that the search result is classified as likely including sensitive or offensive content;
filtering a search result in the candidate set of search results to remove the search result from the presentation set of search results based on (i) obtaining the indication that the search query used to obtain the search result is classified as likely related to the particular class of people and including sensitive or offensive terms, and (ii) obtaining the indication that the search result is classified as likely including sensitive or offensive content; and
selecting a search result in the candidate set of search results to be included in the presentation set of search results without modifying a ranking of the search result or filtering the search result based on obtaining the indication that the search query used to obtain the search result is classified as not likely related to a particular class of people and as likely including non-sensitive and non-offensive terms; and
providing one or more search results of the presentation set of search results for output in response to the search query.

5. A computer-implemented method comprising:
receiving a search query;
obtaining a candidate set of search results that correspond to the search query;
obtaining an indication that the search query is classified as including query terms that (i) do not likely relate to a particular class of people, (ii) likely relate to the particular class of people, or (iii) likely relate to the particular class of people and include sensitive or offensive terms;
obtaining, for each search result in the candidate set of search results, an indication that the search result is classified as likely including (i) non-sensitive and non-offensive content, or (ii) sensitive or offensive content;

selecting, from among the candidate set of search results, a presentation set of search results based at least on (I) the indication that the search query is classified as including query terms that (i) are not likely related to the particular class of people, (ii) are likely related to the particular class of people, or (iii) are likely related to the particular class of people and include sensitive or offensive terms, and (II) the indication that the search result is classified as likely including (i) non-sensitive and non-offensive content, or (ii) sensitive or offensive content, wherein selecting, from among the candidate set of search results, the presentation set of search results comprises one or more of:

selecting a search result in the candidate set of search results to be included in the presentation set of search results without modifying a ranking of the search result or filtering the search result based on obtaining the indication that the search query used to obtain the search result is classified as not likely related to a particular class of people and as likely including sensitive or offensive terms; and filtering a search result in the candidate set of search results to remove the search result from the presentation set of search results based on obtaining the indication that the search query used to obtain the search result is classified as likely related to the particular class of people and as likely including sensitive or offensive terms; and providing one or more search results of the presentation set of search results for output in response to the search query.

6. A non-transitory computer-readable storage medium comprising instructions, which, when executed by one or more computers, cause the one or more computers to perform actions comprising:

receiving a search query;

obtaining a candidate set of search results that correspond to the search query;

obtaining an indication that the search query is classified as including query terms that (i) do not likely relate to a particular class of people, (ii) likely relate to the particular class of people, or (iii) likely relate to the particular class of people and include sensitive or offensive terms;

obtaining, for each search result in the candidate set of search results, an indication that the search result is classified as likely including (i) non-sensitive and non-offensive content, or (ii) sensitive or offensive content;

selecting, from among the candidate set of search results, a presentation set of search results based at least on (I) the indication that the search query is classified as including query terms that (i) are not likely related to the particular class of people, (ii) are likely related to the particular class of people, or (iii) are likely related to the particular class of people and include sensitive or offensive terms, and (II) the indication that the search result is classified as likely including (i) non-sensitive and non-offensive content, or (ii) sensitive or offensive content, wherein selecting, from among the candidate set of search results, the presentation set of search results comprises one or more of:

reducing a ranking of a search result in the candidate set of search results based on (i) obtaining the indication that the search query used to obtain the search result is classified as likely related to the particular class of people, and (ii) obtaining the indication that the search result is classified as likely including sensitive or offensive content;

filtering a search result in the candidate set of search results to remove the search result from the presentation set of search results based on (i) obtaining the indication that the search query used to obtain the search result is classified as likely related to the particular class of people and including sensitive or offensive terms, and (ii) obtaining the indication that the search result is classified as likely including sensitive or offensive content; and selecting a search result in the candidate set of search results to be included in the presentation set of search results without modifying a ranking of the search result or filtering the search result based on obtaining the indication that the search query used to obtain the search result is classified as not likely related to a particular class of people and as likely including non-sensitive and non-offensive terms; and providing one or more search results of the presentation set of search results for output in response to the search query.

7. The non-transitory computer-readable storage medium of claim 6, wherein the particular class of people includes a group of people having at least one demographic characteristic in common.

8. The non-transitory computer-readable storage medium of claim 6, wherein the particular class of people include (i) people under the age of eighteen, (ii) people under the age of thirteen, or (iii) people under the age of nine, wherein the sensitive or offensive terms include terms associated with one or more of pornography, violence, gore, and spoof, and wherein the sensitive or offensive content includes images, video, or data associated with one or more of pornography, violence, gore, and spoof.

9. A non-transitory computer-readable storage medium comprising instructions, which, when executed by one or more computers, cause the one or more computers to perform actions comprising:

receiving a search query;

obtaining a candidate set of search results that correspond to the search query;

obtaining an indication that the search query is classified as including query terms that (i) do not likely relate to a particular class of people, (ii) likely relate to the particular class of people, or (iii) likely relate to the particular class of people and include sensitive or offensive terms;

obtaining, for each search result in the candidate set of search results, an indication that the search result is classified as likely including (i) non-sensitive and non-offensive content, or (ii) sensitive or offensive content;

selecting, from among the candidate set of search results, a presentation set of search results based at least on (I) the indication that the search query is classified as including query terms that (i) are not likely related to the particular class of people, (ii) are likely related to the particular class of people, or (iii) are likely related to the particular class of people and include sensitive or offensive terms, and (II) the indication that the search result is classified as likely including (i) non-sensitive and non-offensive content, or (ii) sensitive or offensive content, wherein selecting, from among the candidate set of search results, the presentation set of search results comprises one or more of:

selecting a search result in the candidate set of search results to be included in the presentation set of search results without modifying a ranking of the search result or filtering the search result based on obtaining the indication that the search query used to obtain the search result is classified as not likely related to a particular class of people and as likely including sensitive or offensive terms; and filtering a search result in the candidate set of search results to remove the search result from the presentation set of search results based on obtaining the indication that the search query used to obtain the search result is classified as likely related to the particular class of people and as likely including sensitive or offensive terms; and providing one or more search results of the presentation set of search results for output in response to the search query.

10. A system comprising:

one or more computers and one or more storage devices storing instructions that are operable and when executed by one or more computers, cause the one or more computers to perform actions comprising:

receiving a search query;

obtaining a candidate set of search results that correspond to the search query;

obtaining an indication that the search query is classified as including query terms that (i) do not likely relate to a particular class of people, (ii) likely relate to the particular class of people, or (iii) likely relate to the particular class of people and include sensitive or offensive terms;

obtaining, for each search result in the candidate set of search results, an indication that the search result is classified as likely including (i) non-sensitive and non-offensive content, or (ii) sensitive or offensive content;

generating a relevance score for a document corresponding to each search result in the candidate set of search results, the relevance score being indicative of a relevance of the document to the search query;

determining a ranking for each search result in the candidate set of search results;

receiving user session data that include one or more attributes of a user device;

selecting, from among the candidate set of search results, a presentation set of search results based at least on (I) the indication that the search query is classified as including query terms that (i) are not likely related to the particular class of people, (ii) are likely related to the particular class of people, or (iii) are likely related to the particular class of people and include sensitive or offensive terms, and (II) the indication that the search result is classified as likely including (i) non-sensitive and non-offensive content, or (ii) sensitive or offensive content, wherein selecting, from among the candidate set of search results, the presentation set of search results comprises:

modifying rankings of one or more search results in the candidate set of search results based on the user session data that includes the one or more attributes of the user device; and for each document corresponding to a search result: assigning a label to the document based at least on the indication that the search result is classified as including sensitive or offensive content, the label being indicative of subject matter included in the document; and determining to filter the search result or modify the ranking of the search result based on the assigned label; and providing one or more search results of the presentation set of search results for output in response to the search query.

11. The system of claim 10, wherein the particular class of people includes a group of people having at least one demographic characteristic in common, wherein the sensitive or offensive terms include terms associated with one or more of pornography, violence, gore, and spoof, and wherein the sensitive or offensive content includes images, video, or data associated with one or more of pornography, violence, gore, and spoof.

12. A system comprising:

one or more computers and one or more storage devices storing instructions that are operable and when executed by one or more computers, cause the one or more computers to perform actions comprising:

receiving a search query;

obtaining a candidate set of search results that correspond to the search query;

obtaining an indication that the search query is classified as including query terms that (i) do not likely relate to a particular class of people, (ii) likely relate to the particular class of people, or (iii) likely relate to the particular class of people and include sensitive or offensive terms;

obtaining, for each search result in the candidate set of search results, an indication that the search result is classified as likely including (i) non-sensitive and non-offensive content, or (ii) sensitive or offensive content;

selecting, from among the candidate set of search results, a presentation set of search results based at least on (I) the indication that the search query is classified as including query terms that (i) are not likely related to the particular class of people, (ii) are likely related to the particular class of people, or (iii) are likely related to the particular class of people and include sensitive or offensive terms, and (II) the indication that the search result is classified as likely including (i) non-sensitive and non-offensive content, or (ii) sensitive or offensive content, wherein selecting, from among the candidate set of search results, the presentation set of search results comprises one or more of:

reducing a ranking of a search result in the candidate set of search results based on (i) obtaining the indication that the search query used to obtain the search result is classified as likely related to the particular class of people, and (ii) obtaining the indication that the search result is classified as likely including sensitive or offensive content;

filtering a search result in the candidate set of search results to remove the search result from the presentation set of search results based on (i) obtaining the indication that the search query used to obtain the search result is classified as likely related to the particular class of people and including sensitive or offensive terms, and (ii) obtaining the indication that the search result is classified as likely including sensitive or offensive content; and selecting a search result in the candidate set of search results to be included in the presentation set of search results without modifying a ranking of the search result or filtering the search result based on obtaining the indication that the search query used to obtain the search result is classified as not likely related to a particular class of people and as likely including non-sensitive and non-offensive terms; and providing one or more search results of the presentation set of search results for output in response to the search query.

13. A system comprising:

one or more computers and one or more storage devices storing instructions that are operable and when executed by one or more computers, cause the one or more computers to perform actions comprising:

receiving a search query;

obtaining a candidate set of search results that correspond to the search query;

obtaining an indication that the search query is classified as including query terms that (i) do not likely relate to a particular class of people, (ii) likely relate to the particular class of people, or (iii) likely relate to the particular class of people and include sensitive or offensive terms;

obtaining, for each search result in the candidate set of search results, an indication that the search result is classified as likely including (i) non-sensitive and non-offensive content, or (ii) sensitive or offensive content;

selecting, from among the candidate set of search results, a presentation set of search results based at least on (I) the indication that the search query is classified as including query terms that (i) are not likely related to the particular class of people, (ii) are likely related to the particular class of people, or (iii) are likely related to the particular class of people and include sensitive or offensive terms, and (II) the indication that the search result is classified as likely including (i) non-sensitive and non-offensive content, or (ii) sensitive or offensive content, wherein selecting, from among the candidate set of search results, the presentation set of search results comprises one or more of:

selecting a search result in the candidate set of search results to be included in the presentation set of search results without modifying a ranking of the search result or filtering the search result based on obtaining the indication that the search query used to obtain the search result is classified as not likely related to a particular class of people and as likely including sensitive or offensive terms; and filtering a search result in the candidate set of search results to remove the search result from the presentation set of search results based on obtaining the indication that the search query used to obtain the search result is classified as likely related to the particular class of people and as likely including sensitive or offensive terms; and providing one or more search results of the presentation set of search results for output in response to the search query.

* * * * *

UNITED STATES PATENT AND TRADEMARK OFFICE
CERTIFICATE OF CORRECTION

PATENT NO. : 10,083,237 B2  
APPLICATION NO. : 14/841078  
DATED : September 25, 2018  
INVENTOR(S) : Heiler et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 397 days.

Signed and Sealed this  
Twenty-fifth Day of June, 2019

Andrei Iancu  
*Director of the United States Patent and Trademark Office*